No. 866,668. PATENTED SEPT. 24, 1907.
L. H. McGRAW.
RUNNING GEAR.
APPLICATION FILED NOV. 22, 1906.
2 SHEETS—SHEET 1.
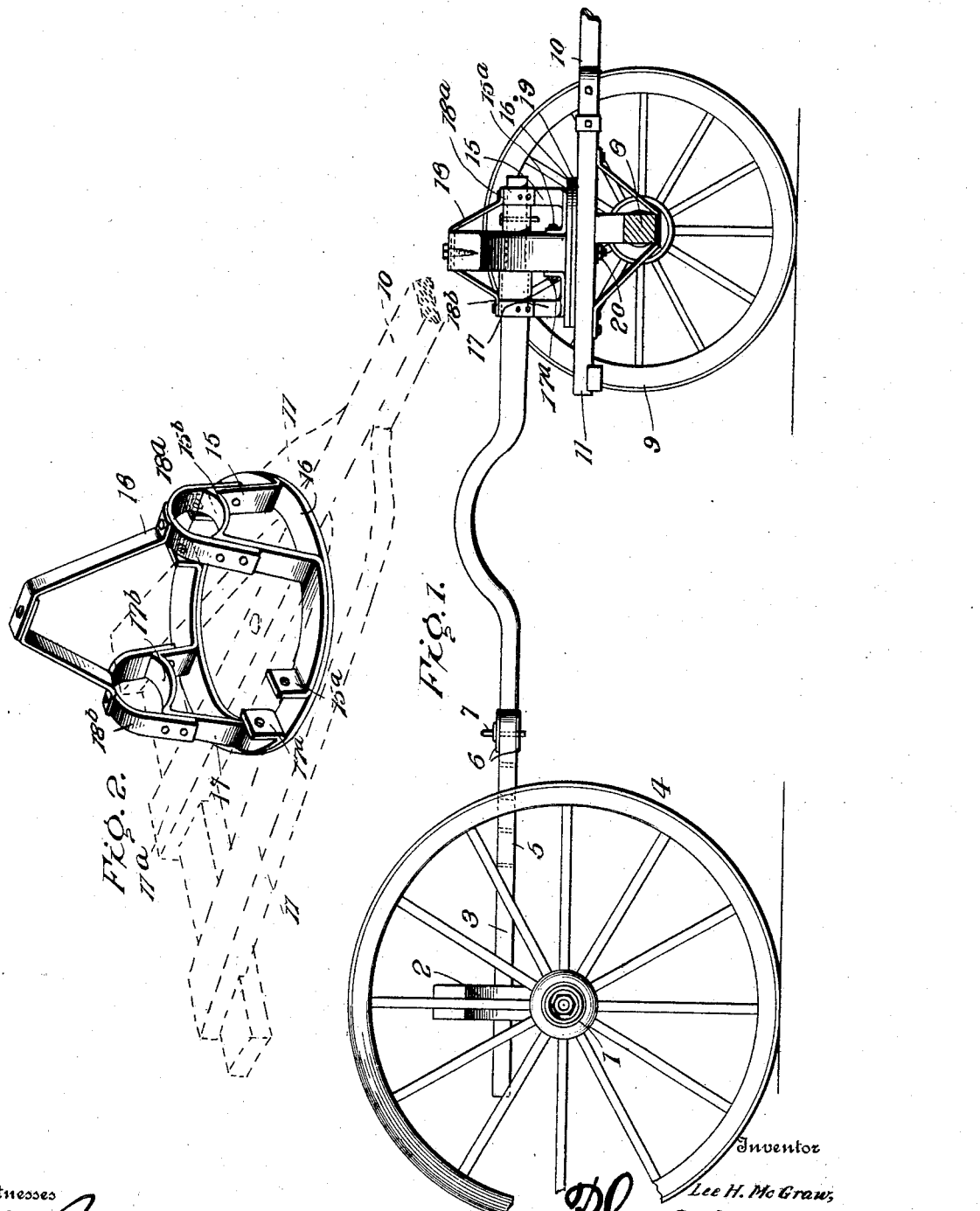
Witnesses
Inventor
Lee H. McGraw,
By
Attorneys No. 866,668. PATENTED SEPT. 24, 1907.
L. H. McGRAW.
RUNNING GEAR.
APPLICATION FILED NOV. 22, 1906.
2 SHEETS—SHEET 2.
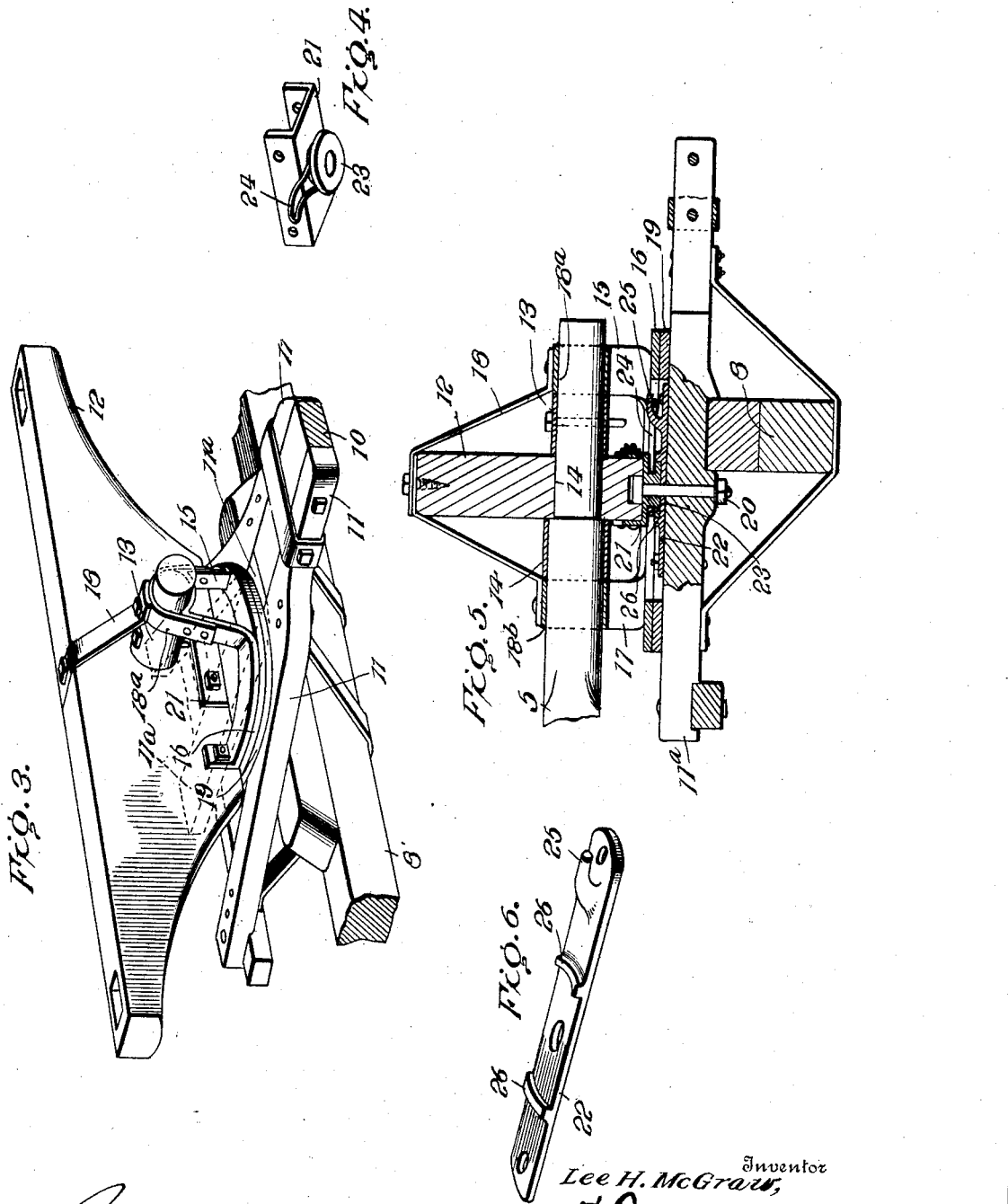
Witnesses
Inventor
Lee H. McGraw,
By
Attorneys

UNITED STATES PATENT OFFICE.

LEE H. McGRAW, OF MONTEREY, KENTUCKY.

RUNNING-GEAR.

No. 866,668.       Specification of Letters Patent.      Patented Sept. 24, 1907.

Application filed November 22, 1906. Serial No. 344,610.

*To all whom it may concern:*

Be it known that I, LEE H. McGRAW, a citizen of the United States, residing at Monterey, in the county of Owen and State of Kentucky, have invented certain new and useful Improvements in Running-Gear, of which the following is a specification.

This invention relates to running gear for vehicles being particularly designed for farm wagons, the purpose being to devise a novel form of connection between the front bolster and front axle, whereby torsional strain is overcome and side wrenching obviated in a great measure when one or the other of the wheels drops into a rut or passes over an obstacle.

For a full description of the invention and the merits thereof and also to acquire a knowledge of the details of construction of the means for effecting the result, reference is to be had to the following description and accompanying drawings, in which:

Figure 1 is a side view of a running gear embodying the invention, the front truck being in section and a portion of the rear hound on the near side broken away. Fig. 2 is a detail perspective view of the upper member of the fifth wheel showing the brackets attached thereto for supporting the front portion of the coupling pole, or reach, upon opposite sides of the front bolster. Fig. 3 is a detail perspective view of the front truck, end portions of the axle being broken away. Fig. 4 is a detail perspective view of the upper iron secured to the lower edge of the front bolster. Fig. 5 is a vertical central longitudinal section of the front truck, the rear portion of the reach being broken away. Fig. 6 is a detail perspective view of the lower iron attached to the hounds, forming a part of the front truck.

Corresponding and like parts are referred to in the following description and indicated in all the views of the drawings by the same reference characters.

The running gear illustrated is of the type in which the rear truck is adjustable to admit of varying the length of the running gear according to the size of the bed, or the length of poles, lumber, or the like, to be placed directly upon the bolsters in the event of the wagon body being dispensed with.

The rear truck comprises an axle 1, bolster 2, hounds 3 and ground wheels 4. The front ends of the hounds 3 are spaced apart a distance to receive between them the coupling pole, or reach, 5, the same passing through an opening in the bolster 2. Plates 6 connect the front ends of the hounds 3 and embrace top and bottom sides of the reach and are provided with openings in vertical alinement to receive a pin 7 by means of which the rear truck is secured to the coupling pole, or reach 5, in an adjusted position, said pin passing through one of a series of openings formed in the reach.

The axle of the forward truck is mounted so as to turn, thereby admitting of steering the vehicle, or running gear, properly and in the present instance, the construction is such as to admit of the axle turning around freely in either direction, whereby the running gear, or wagon, may turn in its own length.

To give proper support to the axle and front bolster, a fifth wheel is interposed between them, one member of the fifth wheel being firmly and securely attached to each part. The front axle 8 is provided with ground wheels 9 and a draft appliance is hitched thereto, the same in the present instance consisting of a pole, or tongue 10 side hounds 11 and middle hound 11$^a$. The front bolster 12 is formed intermediate of its ends with an opening through which the forward portion of the coupling pole, or reach 5, passes and upon which the front bolster is adapted to turn whereby provision is had to admit of the front truck accommodating itself to the condition of the road bed or surface over which the running gear, or vehicle, is traveling, so as to overcome strain and stress incident to one or the other of the wheels 9 either dropping into a rut, or passing over a stone, root, or other obstruction. The forward portion of the coupling pole, or reach 5, is made rounding and an opening in the bolster 12 provided to receive the rounded portion of the reach is made of corresponding shape. Sleeve like irons 13 and 14 encircle the rounded portion of the reach, one in front of and the other in the rear of the bolster 12.

To the upper member 16 of the fifth wheel, front and rear arched brackets 15 and 17 are secured, said brackets being formed respectively with transversely curved seats 15$^b$ and 17$^b$ adapted to receive the rounded portion of the reach. The ends of these brackets are spaced from each other as shown, and turn upwardly as indicated at 15$^a$, 17$^a$, and bolts extend through the bolster and connect these upwardly turned ends to the latter. Cap pieces 18$^a$ and 18$^b$ are inserted over the rounded end of the reach and are secured to the respective brackets 15 and 17 so as to form bearings in which the reach may turn about its longitudinal axis, and a strap iron 18 passes over the bolster 12 and is bolted or otherwise secured thereto, the end portions of said strap iron being secured to the cap pieces as clearly illustrated in the drawings. It will thus be seen that firm connection is had between the bolster 12 and the reach 5, while at the same time provision is made for turning the bolster with reference to the reach so as to adapt itself to any change in the level of the front truck without subjecting the reach to torsional strain. The fifth wheel also includes a lower member or wear plate 19 which coöperates with the upper member 16, each of the members consisting of a ring of like diameter mounted to turn one upon the other. The lower member 19 of the fifth wheel is secured to the front axle 8 and to the hounds 11 and 11$^a$, in any desired way. A king bolt 20 is located at the center of the fifth wheel members and is supported in irons 21 and 22, the iron 21 being secured to the bolster 12 and the iron 22 being secured to the middle hound 11ª, as best seen in Fig. 5. The said irons and fifth wheel are so arranged that the said king bolt comes entirely in the rear of the front axle 8, thereby obviating weakening of the same. The upper iron 21 is formed on its upper face with a seat in which the lower edge of the bolster is fitted, and a circular projection 23 is formed upon its lower side and is curved to receive a draft iron 24. The iron 21 is formed with a vertical opening through which the king bolt 20 passes, and a corresponding opening is formed through the center of the circular projection 23. The head of the king bolt 20 is confined between the iron 21 and the bolster. The lower iron 22 is provided with a hook 25 preferably formed integrally therewith and which receives the free end of the draft iron 24, so as to connect said parts together.

The lower iron 22 is provided on its upper side with transverse ribs 26 which embrace front and rear portions of the circular projection 23, thereby relieving the king bolt 20 of the strain incident to pulling or backing.

The ribs 26 are curved to conform to the circumference of the projection 23 so as to fit the same snugly.

Having thus described the invention, what is claimed as new is:

1. In vehicle running gear, the combination of a bolster, axle, and hounds of the forward truck, a fifth wheel between the same comprising upper and lower members attached to the respective parts, and a draft iron connection between the bolster and hounds and adapted to turn with the front axle and support and strengthen the king bolt and fifth wheel connection at all positions of the said axle.

2. In vehicle running gear, the combination of a front truck comprising a bolster, an axle and the usual fifth wheel connection, a reach passed through an opening of the bolster and extending forward thereof a short distance, bracket irons attached to the front and rear portions of the upper member of the fifth wheel and supporting said reach, and a strap-iron extended over the bolster and attached thereto and having its end portions overlapping the reach and secured to said front and rear brackets.

3. In vehicle running gear, the combination of the bolster and axle, a king bolt connection between said parts, an iron attached to the bolster and having a circular projection pendent therefrom, a complemental iron having connection with the axle and provided with a hook and a draft iron in engagement at one end with said hook and having its opposite end fitted to the said circular projection to turn thereon with the axle.

4. In vehicle running gear the combination of a bolster, an axle, king bolt connection with the bolster, an iron connected to the bolster and having a pendent circular projection, a second iron having connection with the axle and provided with a hook and with projecting portions embracing the aforesaid circular projection of the iron attached to the bolster and a draft iron in engagement at one end with the aforesaid hook and having its opposite end portion fitted to the said circular projection.

5. In vehicle running gear, the combination of a bolster, an axle, a fifth wheel having its members connected to respectively the said bolster and axle, a king bolt connecting the bolster with the axle and out of line with the latter, a reach having its forward portion made rounding and passed through an opening of the bolster and adapted to turn therein, brackets secured to the front and rear portions of the fifth wheel and receiving the reach and supporting the same at each side of the bolster, cap pieces confining the reach to said brackets and a strap-iron extended from the bolster and having connection at its ends with the said brackets.

In testimony whereof I affix my signature in presence of two witnesses.

LEE H. McGRAW. [L. S.]

Witnesses:
V. B. HILLYARD,
W. N. WOODSON.